3,712,803
COMPOSITION AND METHOD FOR TREATING PLANTS AND TREES
Roland S. Grybek and Frederick B. Johnston, Tampa, Fla., assignors to Marketing and Research Services, Inc., Coral Gables, Fla.
No Drawing. Continuation-in-part of application Ser. No. 417,215, Dec. 9, 1964. This application June 4, 1969, Ser. No. 830,508
Int. Cl. A01n 9/02
U.S. Cl. 71—79
9 Claims

ABSTRACT OF THE DISCLOSURE

A composition is provided which is effective to promote growth and impart freeze resistance to fruits, vegetables, and ornamental plants and trees. The composition is provided by combining a proteinaceous material, such as trash fish, with a lignin sulfonic acid salt, such as calcium lignin sulfonate, subjecting the mixture to acid hydrolysis effective to solubilize substantially all the protein content, and treating the hydrolyzed mixture with oxygen with continuous agitation at a temperature of 20 to 80° C. for a period of from about 2 hours to two days. The resulting composition can be effectively applied to plants and trees as a foliar spray or an addition to the root zone soil, in amounts ranging from as little as about 0.01 gram per plant, on a dry weight basis, for smaller plants, up to as much as about 0.5 gram per tree, on a dry weight basis, for larger trees.

---

This application is a continuation-in-part of applicant's copending application, Ser. No. 417,215, filed Dec. 9, 1964, and now abandoned.

This application relates to treating plants and trees, either food-crop producing or ornamental, to promote their growth and to increase their resistance to extremes of temperature, and particularly to prevent damage or destruction thereof by frost or cold. This application also relates to a composition for so treating plants and trees, and to a method whereby such compositions are obtained.

The desirability of means for promoting growth, rapidity of maturation, and yield of food crops is well known in light of increasing concern over the so-called population explosion, the ubiquitous prophecies of impending world crises devolving from food shortages, and the current extent of malnutrition existing in the world. The extensive economic impact, on both growers and consumers, of crop failures and shortages due to frost and freeze damage is also well-known, and effective means to impart freeze resistance is obviously equally desirable.

Plant growth promotors, unlike common fertilizing compositions which supply nutrients, act to stimulate or initiate the metabolic reactions. Such promotors are known to the art. For example, certain natural and synthetic auxins and gibberellins have been suggested. While such materials have been observed to confer certain desirable effects upon growth rate and yield, these are generally of short duration and limited in scope of effectiveness. Such materials are rather difficult to prepare, expensive, and require substantial and frequent additions. The growth promotors of the prior art are also not noted for secondary benefits, such as increasing freeze protection of plants and trees.

The extent of damage done to plants and trees by temperature extremes is well known. High temperatures cause the wilting of plants and often results in such great demands by the leaves for moisture that the root systems are unable to supply the necessary fluid and the plant dies. Low temperatures, especially frosts, similarly cause plant cells to be adversely affected, and they will often freeze and burst, causing death or severe damage to the plant. It is not unusual to find, particularly in Florida and other substantial citrus growing areas, such as the southeastern part of the United States, the growers are compelled to employ, with only limited success, smudge pots, fans, and even helicopters to circulate warmer air over citrus groves and prevent freezing of the fruit and trees during cold weather. Of such importance is the prevention of freezing of the plants and the dropping of blossoms or fruit from trees, vines and vegetables, such techniques are being more frequently employed in even colder climates, such as the northern United States and Canada, for even heartier plants and trees.

Despite the considerable expense of efforts to avoid the effect of freeze or overheating, such methods are being ever more extensively practiced, because of the extensive losses suffered in the absence of such efforts. The expense is a severe burden, not only upon the grower, but on the consumer as well, and the success of such efforts is quite limited at best.

It has been found that the usual temperature extremes to which plants, trees and other phytic growth are subjected during extreme weather conditions, are usually not more than a few degrees Fahrenheit different from extremes which the plants can normally stand without suffering any permanent ill effects. Therefore, there has been a need for treatment of plants which would extend the temperature ranges over which plants are resistant to extremes of temperature. Now, such a treatment has been discovered. It involves a single application of novel composition to the material to be treated, which can be easily effected and at economic cost in a short time. Furthermore, the materials from which the composition is made are readily available and are inexpensive.

Prior art materials used to treat plants include insulating or coating agents, such as oils and waxes. Of course, these operate externally and do not change the ability of the plant to transport nutrients or circulate fluids or to modify plant conditions. The use of surface active agents and penetrating aids may be considered as an attempt to improve circulation and the uses of sugars and glycols are exemplary of nutrients and modifiers of osmotic pressure of freezing point depressants being added to the plant system, if they are absorbed. Despite such effort to improve the prior art treatments, they have not proved to be successful. On the other hand, the present methods and compositions permit the protection of plants and trees against temperature extremes without many of the difficulties and expenses confronting users of the other treatments, and by internal actions, so that the plants, themselves, are adapted to withstand the temperature extremes in a substantial proportion, often a major proportion of extreme temperature conditions to which they will be subjected. It must be borne in mind that the present invention is not of a cure-all method which will enable plants and trees to withstand all extremes of temperature, it is of a method which will, easily and economically, save a large number of trees and plants subjected to conditions which otherwise would severely damage or kill them.

In accordance with the invention there is provided a method for protecting plants and trees against temperature extremes which comprises applying to the plant or tree to be treated a protective amount of a reaction product of protein and lignin which has been hydrolyzed and oxidized under acid conditions. Within the invention is the novel reaction product so made and a method for its manufacture.

More particularly, we have found that by employing the novel compositions of our invention we can protect plant growth from freezing when exposed to temperatures substantially below their normal freezing temperatures.

It appears that the mechanism of the protection developed depends on the sorption of the invented composition by the plant and the effect that this has on the healthiness of the plant cell structure and the ability of the plant to withstand heat and cold. However, it is not to be considered that applicants are bound by this or any other theory, since the invention is not of a theory but relates to methods and a novel composition for effecting the described section.

The composition of the present invention is prepared by combining in an aqueous medium a source of proteinaceous material with a lignin material, and treating the aqueous mixture to hydrolyze the protein, and to oxidize the mixture. The composition can be used as prepared, but generally will be diluted with water or deposited on an inert, dry, solid diluent as will be hereinafter discussed in detail.

The composition provided thereby is an effective promoter of growth for ornamental and food-producing plants and is further and unexpectedly effective to provide freeze resistance to such useful plants. The composition is effective in relatively minor amounts and for longer periods of time when compared with other known growth promoting compositions, and has a surprisingly broad spectrum effect on useful plants generally rather than specific applicability to a particular type of plant. Among the particular advantages provided by the composition of the present invention, the following have been noted: accelerated growth, shortened maturity time, initiation of flowering and fruition under adverse conditions, extended blossom and fruit retention, more uniform maturation and ripening, with consequent advantages in machine harvesting or hand picking, increased resistance to fungal or insect pests, recovery of treated plants already suffering from fungal or insect pests, greater retention of moisture and consequent resistance to drought and extremes of temperature, production of larger, more colorful blossoms and more lush foliage, substantially increased yield of fruits, vegetables, and other food crops, distinct improvement in texture, flavor, and appearance of fruits and vegetables, and superior resistance to spoilage and decay of mature fruits and vegetables after harvesting. Plants suffering from Hibiscus Blight and Crown Rot have been noted to recover at a rapid rate when treated.

The proteinaceous material constituting one of the starting materials in the process for the preparation of the growth promoting composition can be derived from any source of proteins, although for economic purposes and ready availability, it is often desirable to utilize proteinaceous waste materials, with the consequent elimination of the problems attendant upon disposal of such wastes. Such readily available waste materials include slaughter-house scrap, leather processing tankage, cereal grain waste and distillery residues, trash fish and seafood processing discards, cottonseed meal and the like. Such materials often contain about 5 to 20 weight percent of protein based on the dry weight of the solids content, and about 1 to 5 weight percent on an undiluted wet basis. The only necessary prerequisite for such materials is that they shall not have been subjected for any prolonged period to temperatures above about 60° C., i.e., the amino acid components of the proteins must be substantially intact. The preferred source of protein is fish, particularly inexpensive trash fish, such as mullet, menhaden, bunker, and the like. Particularly preferred trash fish include black mullet. Aparat from considerations of ready availability and low cost, fish with higher oil content have been observed to provide better results. The reason for the effect of the oils is not completely understood.

Typical of present uses for the type of fish preferred in the present invention is an ingredient of fish meal, dog food and cat foods.

The fish or shellfish are usually ground or otherwise size-reduced by mechanical disruption before hydrolysis. Ultrasonic treatment and proteolytic enzyme action likewise can be utilized to reduce the fish tissue to small particles, some of which may even be of molecular size. Whatever method is employed, it is desirable to reduce the fish to a slurry form prior to use, although it is not essential to grind the fish and even the unground whole fish may be used.

Natural oils from the fish are released during the mechanical reduction, and in the subsequently described hydrolysis and oxidation, and constitute a commercially valuable by-product which can be removed by decantation, centrifuging or other procedures. However, for the successful utilization of the product of our invention, these oils need not be removed but can be incorporated into the final product without evident disadvantage. Indeed, it is preferred that the oils not be removed, since some advantages appear related to the oil content.

Substantially any available source of lignin will serve as a satisfactory source of the second starting material in the preparation, although the advantages of the use of a soluble lignin salt far outweigh other forms, to the practical exclusion of water-insoluble lignins. The preferred source of the lignin is an alkaline earth metal salt, such as calcium lignosulfonate. Such materials are readily available commercially as a waste or by-product of the manufacture of paper. The solids content of such commercially available materials can vary widely, but often range from about 30 to 80% solids. Any convenient solids content can be used in the present invention.

The proteinaceous material and the lignin material, e.g., finely ground, whole, trash fish and an aqueous solution of calcium lignosulfonate, are combined and mixed, and, if necessary, the water content is adjusted to provide an easily handled slurry. The proportions of lignin to protein are not narrowly significant in obtaining the beneficial results, and can range from about 0.1 to 3.0 parts by weight or even more calcium lignosulfonate per part of proteinaceous material.

The mixture is then hydrolyzed to solubilize the proteins, e.g., by the addition of a mineral acid and stirring or otherwise agitating for a period of about two to six hours at a temperature of about 20 to 80° C. It is desirable to hydrolyze at least about two-thirds, preferably substantially all, of the available protein. About one pound of 75% phosphoric acid is effective to hydrolyze about one pound by dry weight of proteinaceous material. In the event that bone matter or other materials are present which would react with the free mineral acid, a sufficient excess of the acid must be provided to insure hydrolysis of the proteins. In addition to the use of mineral acids, enzymatic hydrolysis can also be used where conditions are advantageous. Alkali hydrolysis can result in racemization of the amino-acids and is accordingly undesirable.

The extent of hydrolysis is readily determined by treating an aliquot sample of the hydrolysis slurry with an equal volume of 10% trichloroacetic acid, followed by centrifugation. The volume of the resulting precipitate, when compared to the original unhydrolyzed slurry, gives an approximate volumetric determination of the remaining unhydrolyzed protein.

Concurrent with or subsequent to the hydrolysis, the mixture is treated under oxidizing conditions, such as contacting with air at a temperature of about 20 to 80° C. for a period of two hours to six days, at a pH of 1.0 to 4.5, preferably 2.0 to 3.5, with continuous agitation. The slurried mixture can be stirred or agitated in such a fashion that air is entrained, or air or oxygen can be bubbled through the mixture.

The procedure is considerably simplified, by combining the hydrolysis and the oxidation in concurrent operation, and such an operation is accordingly preferred. Such an operation is now described in detail as the best mode of conducting the process.

A mechanically disrupted fish slurry is mixed with a solution of calcium lignosulfonate in suitable proportions and the water content is adjusted to provide a slurry of suitable stirring consistency with a minimum of water. Hydrolyzing acid, preferably phosphoric acid is added gradually in an amount sufficient to attain a pH of 1.5 to 2.7, preferably about 2.5. The slurry is stirred continuously, in such a fashion that air is entrained in the mixture, and the temperature is gradually increased, e.g., over the course of at least one hour, to a temperature of 76 to 77° C., where it is maintained for at least 1 hour. It is preferred to maintain at least 5 hours total heating, such as 4 hours gradual heating to 76 to 77° C., and 1 hour at that temperature. The reaction mixture is then allowed to cool to ambient temperature and is substantially neutralized with potassium hydroxide or other suitable base. The reaction mixture is then allowed to stand for an additional period of at least about 8 hours, preferably 24 hours or even longer, at which time the product can be diluted or otherwise prepared in the preferred manner for application to plants and trees.

The oxidized mixture is adjusted to a pH between 4.5 and 7.0 and filtered or decanted. The neutralized reaction product can then be adjusted to a convenient concentration for direct application as a foliar spray, or applied to the root zone of plants without separation of the insolubles content, in which case the solids can serve as a useful reserve of slowly degrading proteins and phosphates to supply nutrients to the plant. The product can be dried and handled in many convenient fashions, in liquid solution, slurry, or in solid form, either alone or in admixture with other agricultural chemicals and adjuvants, such as, for example, compatible wetting agents, inert carriers, spreaders, stickers, pesticides, nutrient fertilizers, and the like. The effective amount to be used to obtain the benefits of the composition is very small, such as about 1.0 to 20.0 pounds per acre on a dry basis. A very effective application is about 6 pounds per acre, which corresponds to 1 fluid ounce of a solution containing 0.75% by weight solids per plant, or about 0.01 to 0.03 gram, on a dry weight basis, per plant, when the plants are located at two foot intervals, typical of, for example, tomato plants. When larger plants or trees are treated, somewhat larger amounts will be used, e.g., up to about 0.5 gram, on a dry weight basis, of the reaction product per plant.

The mechanism by which the growth promoting composition of the present invention operates appears to depend upon sorption of the material by the treated plant. Since the oxidation of the hydrolyzed protein-lignin mixture is requisite to the production of an active material, it is possible that the effect is provided by alpha-keto acids formed from the many amino acids occurring in proteins; such amino acids are well known and include, for example, tryptophane, phenyl alanine, tyrosine, and the like. It is entirely possible that the lignin serves to catalyze the formation of alpha-keto acids, as well as function as an active component of the composition.

The simple alpha-keto acid, oxaloacetic acid, formed by deamination of aspartic acid, is known to be associated with important respiratory pathways of plant metabolism, such as the Krebs citric acid cycle, figuring significantly in carbohydrate catabolism and in photosynthesis. Limited investigation of synthesized alpha-keto acids tend to verify that these are the active ingredient of the composition of the present invention. Such preparations are prepared only at great expense, however, and complete verification has not been possible. None of the acids tested, singly and in combination, have approached the overall effectiveness of the product of the present invention, prepared from whole proteins. This suggests that the product of the present invention represents a more complete balance of components or a better potentiated product. Applicants do not, however, intend to be bound by this or any other theory concerning the active species or the mode of operation of the composition of the present invention.

The sprays or powders are applied to the leaves or stems or roots of the plants or trees to be treated. Leaf application may be by means of foliar spraying means and the use of such conventional equipment usually will result in the application of some of the sprayed substances being applied to the stems too, and to the ground adjacent to the roots of the plant. Powders may be dusted on the foliage. Both liquids and powders may be applied to the ground adjacent the roots or may be turned into the ground or applied through holes in the ground near the roots, at an appropriate concentration, such as, for example, 6 pounds per acre, which corresponds to 33 milliliters of a ¾ percent solids solution per tomato plant, when tomato plants are planted every two feet. Similar aplication rates have been found useful for oranges, cucumbers, beans, peas, grapes, melons, sugar cane, ornamentals and many other plants and trees. The most striking effects observed are during frosts when the temperature of the air descends to about three or four degrees centigrade below freezing. Under such circumstances, application of the invented materials in accordance with the methods herein described make the plant or three resistant to the frost and freezing cold and allows it to recover completely once the cold has passed. On the contrary, control plants exhibit frozen fruits, which soon falls off and spoils, drooping leaves, which fall, and even frozen branches, limbs and trunks, which often results in the death of the tree or plant. It has been noted that these reactions are obtainable in the laboratory, but they are even more pronounced with field grown plants and trees, apparently because such plants and trees acquire a small measure of resistance to cold even without the use of the present invention. But that small resistance is not sufficient to save many of them from extreme cold and frost, which the present invention does.

Application of the present compositions to trees and plants can be as a foliar spray, or deposited on inert solids, usually particulate materials such as powders. The solutions may be applied around the root zones of the plants or as a foliar spray. In applications around the root zones of vegetables and ornamental plants, ten to fifty milliliters of a one percent solids solution of the present composition is added per plant. For the treatments of trees, such as citrus trees, proportionally greater amounts are employed. For root zone application of a soluble form of the invented composition, the ground should be thoroughly wetted before application, or lightly wetted following addition of the solution. Higher dilutions than the one percent solids solution are better for foliar sprays. Solid forms of the invented materials, dried or sorbed on a carrier, are added in proportional quantity in the vicinity of the root zone. In case of drill application, the seeds or roots should not be allowed to come into direct contact with the material. For freeze protection, application 14 to 48 hours in advance is satisfactory for ornamentals and small vegetables. For larger plants and trees, longer advance periods, such as 2 to 7 days should be allowed. Effectiveness of the material of this invention for freeze protection has been demonstrated satisfactorily at 60 days after root zone application.

The importance of the freeze-preventing and growth promoting effects of the invention can hardly be overestimated. Especially with the almost complete dependence of the United States market for citrus fruits on the groves of Florida, Texas, Arizona and California, any freezes can have drastic economic effects. Also, the investments of time and labor in crops are great. Now, by the use of the present invention, the risk of loss due to frost can be greatly minimized and the expenses incurred in earlier methods of treatment, often unsuccessful, can be decreased. Furthermore, the present invention, used together with the older methods, such as smudging, will lower further the temperature at which tree and fruits and vegetables will freeze. Although they will not be described in detail at this point, the related processes of applying the new compositions also protects plants and trees against excessive heat. It is thought that the effects of drying winds are also thereby mitigated. This property is also important in making various flowering plants winter-hardy.

EXAMPLE I

Five pounds of black mullet are reduced to a fine slurry by mechanical grinder of the Disposal type, such as is used for grinding garbage before disposal thereof into sewers. Five pounds of water are added, and into this are mixed 2½ pounds of a 50% solids solution of calcium lignosulfonate. One pound of 75% phosphoric acid is added to yield a pH of 2.5 and the mixture is stirred continuously to entrain air. Reaction time is 48 to 60 hours at 20° C. or one hour at 77° C.

Where a soluble or sprayable dispersion is desired, following neutralization to pH 4 to 5 the supernatent liquid is diluted with 5 to 25 times its volume of water, giving about a 1% solution.

EXAMPLE II

The 1% solids composition of Example I was tested by application to rows of plants adjacent to the same variety of untreated control plants. Both the treated and the untreated control plants were in a condition of optimum health, being supplied with proper amounts of garden fertilizer in addition to which special soluble fertilizer was added to assure the presence of trace elements and organic matter in readily available form. Field test plants were grown in representative Florida soil and were watered in keeping with proper gardening procedure. Prior to occurrence of frost or freeze, plants had previously become accustomed to normal low temperatures of 4 to 7 degrees centigrade for a number of successive days. During the freeze periods, the temperature decreased in 6 to 8 hours from 4° C. to −1° C., and even as low as −5° C., at which low value it remained for 3 to 6 hours.

Under the described conditions the majority of treated plants survived, and gave little evidence of damage. Untreated plants, however, became stiff, leaves became spotted and eventually darkened, and the entire plants wilted slowly and defoliated. Even when treated 60 days in advance of frost and freezing, including subjection to −50° C. for 4 hours, plants to which the material of this invention had been added, were in the majority protected and survived with little evidence of damage and only minor loss. Specific comparisons are given below.

(a) Tomatoes and cabbages, 60 days after transplant of small plants and sets; 60 days after addition of treating composition at rate of 20 milliliters per plant of the composition of Example I.

| Survival | Treated | Untreated |
| --- | --- | --- |
| Tomatoes | 11 of 12 plants | 0 of 12 plants. |
| Cabbage | 10 of 12 plants | 1 of 12 plants. |

(b) Carrots and corn at 105 days after planting of seed. Tomatoes and cabbage 45 days after planting small plants and sets. Treating composition applied 30 days prior to combined frost and freeze at rate of 20 milliliters per plant of the composition of Example I.

| Survival | Treated | Untreated |
| --- | --- | --- |
| Tomatoes | 12 of 12 plants | 0 of 12 plants. |
| Cabbage | do | Do. |
| Carrots | do | 7 of 12 plants. |
| Corn | 10 of 12 plants | 2 of 12 plants. |

(c) Strawberry plants, in bloom when treated 12 days prior to frost and freeze. The treating composition was applied deposited on an adsorbent at a rate equivalent to 20 milliliters of composition of Example I per plant.

| Survival | Treated | Untreated |
| --- | --- | --- |
| Strawberries (field) | 48 of 50 plants | 30 of 50 plants. |

In this field test, the treated plants, in addition of surviving the frost and freeze, gave large yields of superior berries. The untreated plants which survived gave poor yields, and of smaller fruit. In all instances cited above, (a)–(c), the surviving treated plants continued to grow and produce in superior yield and quality. Surviving untreated plants remained static, usually dropping whatever blossom or fruit was present thereon.

EXAMPLE III

Ornamentals exhibit unusual response to this additive. Freeze protection is effected by root application of about 0.2 grams of the solid product of Example I per plant 14 to 24 hours prior to frost or freezing. Poinsettias so treated yield exceptionally large and rich blooms in a fraction of time normal for such plants.

EXAMPLE IV

An orange tree was treated several months in advance of February, the fruit ripening month, employing an equivalent of about 500 milliliters of the 1% solution of Example I, applied to the root zone. The fruit was retained on the tree into July during hot, dry early summer months, and although normally fermentation, drop, or drying of retained fruit would be expected to occur, the fruit remained intact upon the tree, with excellent texture, flavor and no evidence of fermentation or drying. Also, while green, this fruit had survived a severe frost and freeze. Thus, an additional advantage of the invention was the excellent keeping property of unpicked fruit, particularly those varieties which spoil rather readily such as oranges and strawberries.

EXAMPLE V

Tests were conducted upon potted plants using an enclosed insulated chamber, in which temperature could be reduced slowly and maintained at desired value. Inside air was kept circulating slowly and small amounts of fresh air were introduced continuously. Test plants of high quality (in cans) were obtained from local nurseries and were fertilized and watered some weeks in advance of chamber tests. Treated plants were provided additive from 24 hours to 3 weeks in advance of testing by root zone addition of about 20 milliliters of 1% solution of Example I. Tests were made simultaneously in groups of 3 or more treated plants along with an equal number of untreated control plants. Varieties of potted plants tested include tomatoes, peppers, beans, papaya, caladia, poinsettia, flame plant, hibiscus and small citrus trees.

From prevailing outside temperatures of 15° C. the test chamber temperature was gradually reduced over a 3 to 4 hour period of −4° to −5° C. and was maintained for three hours at that temperature. For plants acclimated to normal temperatures of 27° to 29° C., the chamber was reduced to only −2° to −3° for 3 to 4 hours, and then slowly returned to outside temperatures. The thermal shock involved in these changes was sufficient to give clear evidence of failure of ability to survive. Most of the untreated controls died, whereas almost all of the treated plants survived.

Successive freeze tests also were conducted on treated plants to simulate conditions frequently encountered in the field, under which plants frequently die from exhaustion rather than freezing. Plants treated with the material of this invention were demonstrated to endure conditions of at least 3 successive freezes without apparent ill effect.

Furthermore, addition of the composition of this invention to the root zone of many test plants has been shown to confer upon the treated plants the ability not only to survive under prolonged periods of low humidity and high temperature without supplemental water, during which time untreated plants wilted and frequently died, but also when water was again added, the plants so treated then continued further growth and development, and successfully blossomed and produced fruit. In fact, for certain plants which cannot blossom when prevailing night temperatures remain abnormally high (75° F. for tomatoes, etc.), fruiting can be promoted by addition of the material of this invention. Drought hardiness has been conferred on tomatoes, corn, peppers and ornamentals.

Whereas this invention has been described in terms of a limited variety of plants, the examples cited should be considered illustrative, and this invention should be applicable to a wide variety of plants and trees.

Although we have described our invention with more particularity insofar as protecting plant growth and trees from freezing, we have also found that the compositions of our invention also provide for improvements when added to the root zones, or foliage of plants or seeds and/or seed coatings and act to increase their resistance to unusual temperature extremes, including frost and both high and low temperatures, which ordinarily injure and destroy untreated plants, extend blossom and fruit retention on both edible and ornamental plants, extend harvest time and storage life of edible fruits and vegetables and ornamental plants, modify plant pigmentation, improve taste and overall quality of fruits and vegetables, increase per acre and per plant yield of edible and ornamental plants, modify rates of maturation of edible fruits and vegetables and ornamental blossoms, increase resistance of plants to microbial and insect diseases, improve utilization of fertilizers including major elements and trace elements, retard leaching of nutrients from soil by rainfall, modify normal vegetative growth patterns as they relate to size and shape, stimulate rate of growth of plants, improve transplanting of plants and rooting of cuttings, and improve resistance of plants to drought. Recovery of plants injured by severe frost or freezing will be enhanced by application of the invented composition or compositions even though such application is made after exposure to the severe frost and freezing rather than before the exposure. It is accordingly not intended that the invention be narrowly considered or limited except as defined in the appended claims.

What is claimed is:

1. The process of forming a composition for imparting freeze resistance to plants and trees comprising forming an aqueous mixture of a proteinaceous material and an alkaline earth metal lignosulfonate, in a ratio of about 0.1 to 3.0 parts of said lignosulfonate per each part protein, subjecting the mixture to an acid hydrolysis to solubilize at least about two-thirds of the protein content, and subjecting the mixture to oxidation under oxidizing conditions comprising a temperature of about 20 to 80° C., a pH of 1.0 to 4.5, and with continuous agitation for a period of from about two hours to six days in the presence of oxygen, and adjusting the pH thereof to about 4.5 to 7.0.

2. The process of claim 1 wherein said hydrolysis and said oxidation are conducted concurrently.

3. The process of claim 1 wherein the acid used for said acid hydrolysis is phosphoric acid.

4. The process of claim 1 wherein said proteinaceous material is fish.

5. The process of claim 4 wherein said fish is black mullet.

6. The process of claim 1 wherein said alkaline earth metal is calcium.

7. The process of claim 1 wherein substantially all the protein content of the mixture is hydrolyzed to a soluble condition.

8. A product for imparting freeze resistance to plants and trees comprising the product of the process of claim 1.

9. A method of imparting freeze resistance to plants and trees comprising applying to the plant or to the root zone soil at least about 0.01 grams, on a dry weight basis, of the product of claim 8 per plant.

References Cited

UNITED STATES PATENTS

| | | | |
|---|---|---|---|
| 2,735,756 | 2/1956 | Farber | 71—23 |
| 2,589,287 | 3/1952 | Ryan et al. | 99—111 |
| 2,117,087 | 5/1938 | Formhals | 71—22 |

FOREIGN PATENTS

| | | | |
|---|---|---|---|
| 1,162,831 | 2/1964 | Germany | 71—2.4 |

OTHER REFERENCES

Haekht Chemical Dictionary, 3rd edition (1944), p. 689.

Haekht Chemical Dictionary, 3rd edition (1944), p. 254.

Frank et al., Chem. Abst., vol. 52 (1958), 14533f.

Smith et al., J. Am. Chem. Soc., vol. 81 (1959), pp. 2406–09.

Tirado et al., Chem. Abst., vol. 56 (1962), 6316f.

Meybeck et al., Chem. Abst., vol. 58 (1963), 3508d.

LEWIS GOTTS, Primary Examiner

C. L. MILLS, Assistant Examiner

U.S. Cl. X.R.

47—2; 71—113; 252—70

Disclaimer 3,712,803.—*Roland S. Grybek* and *Frederick B. Johnston*, Tampa, Fla. COMPOSITION AND METHOD FOR TREATING PLANTS AND TREES. Patent dated Jan. 23, 1973. Disclaimer filed Mar. 18, 1974, by the assignee, *Marketing and Research Services, Inc.*

Hereby disclaims the portion of the term of the patent subsequent to Nov. 27, 1988.

[*Official Gazette April 16, 1974.*]